(12) United States Patent
Li et al.

(10) Patent No.: US 7,151,892 B2
(45) Date of Patent: Dec. 19, 2006

(54) RAPID ELECTRIC HEATING WATER DISPENSER

(75) Inventors: MingJu Li, Cixi (CN); ZhenHao Pan, Cixi (CN); Neng Zhang, Cixi (CN); ShuTao Hu, Cixi (CN)

(73) Assignee: Zhejiang Qinyuan Drinking Water Sci. & Tech. Co., Ltd., Cixi (CN)

( * ) Notice: Subject to any disclaimer, the term of this patent is extended or adjusted under 35 U.S.C. 154(b) by 0 days.

(21) Appl. No.: 11/217,040

(22) Filed: Aug. 31, 2005

(65) Prior Publication Data

US 2006/0120704 A1   Jun. 8, 2006

(30) Foreign Application Priority Data

Dec. 7, 2004   (CN) ............... 2004 1 0089171

(51) Int. Cl.
*F24H 1/10* (2006.01)
(52) U.S. Cl. ............... 392/479; 392/480; 99/281
(58) Field of Classification Search ............ None
See application file for complete search history.

(56) References Cited

U.S. PATENT DOCUMENTS

| | | | | |
|---|---|---|---|---|
| 4,356,382 A | * | 10/1982 | Keramati et al. ......... 392/471 |
| 4,371,777 A | * | 2/1983 | Roller et al. ............ 392/480 |
| 4,508,023 A | * | 4/1985 | Naya et al. ............. 99/279 |
| 4,653,390 A | * | 3/1987 | Hayes .................. 99/281 |
| 4,825,042 A | * | 4/1989 | Hauslein ............... 392/467 |
| 5,150,448 A | * | 9/1992 | Salomon ............... 392/480 |
| 5,193,139 A | * | 3/1993 | Schiettecatte ........... 392/480 |
| 5,367,607 A | * | 11/1994 | Hufnagl et al. .......... 392/465 |
| 6,085,638 A | * | 7/2000 | Mork et al. ............. 99/282 |
| 6,327,429 B1 | * | 12/2001 | Chan .................. 392/483 |
| 6,701,068 B1 | * | 3/2004 | Lin ................... 392/480 |
| 2003/0198465 A1 | * | 10/2003 | Cai ................... 392/471 |
| 2003/0202787 A1 | * | 10/2003 | Wu ................... 392/467 |

FOREIGN PATENT DOCUMENTS

CN   99223771.8   3/2000

* cited by examiner

*Primary Examiner*—Thor S. Campbell
(74) *Attorney, Agent, or Firm*—Greer, Burns & Crain, Ltd.

(57) ABSTRACT

A rapid electric heating water dispenser includes a body, a base, an electric heating element located in the body, a hot water drain valve and a hot water outlet. A water pipe and an electric heating tube cling to each other through a casting body. A liquefaction inner tube between the outlet of the aforesaid water pipe and the hot water drain valve. The electric heating tube has a capacity matched with the volume of the water pipe to heat the water passed by to at least 75° C. A water head is located between the water inlet of the liquefaction inner tube and the water circuit connected with it, and the water level of the liquefaction inner tube should be higher than that of the water circuit.

19 Claims, 2 Drawing Sheets

RAPID ELECTRIC HEATING WATER DISPENSER

FIELD OF INVENTION

This invention refers to a kind of water dispenser, especially an electric heating water dispenser that can supply boiled water rapidly when needed.

BACKGROUND OF THE INVENTION

A common water dispenser includes a body, a base, a heating system, a refrigeration system located in the body, a water drain valve and a water outlet. On the lower part of the base, there is a reservoir or reservoir connecting to the corresponding refrigeration system and heating system through a cold water pipe and a hot water pipe. The outlets of the refrigeration system and heating system are connected to the relevant cold or hot water dispensing valve and water outlet. Thus, when in use, a user only needs to push the corresponding water dispensing valve and then the desired hot, cold or common-temperature is dispensed. In this way, the water dispenser is very convenient. However, the heating system of the aforesaid water dispenser usually uses a conventional tube whose insulating property is not good under the limitation of current structure and material. Therefore, when the water dispenser is on, the temperature of boiled water will decrease with time if water is not timely drunk. Consequently when the temperature of the boiled water in the dispenser decreases to a certain degree (for example 80° C.), the dispenser will reheat the boiled water.

This successive reheating and cooling of the same water has the following drawbacks: 1) It causes a great loss of nutrient contents such as mineral substance and an increase of nitrite ions and thus is unhealthy. 2) The deposit and fouling of the mineralizer generated by mineral substance on the surface of the heating pipe reduces the heating efficiency of the heating pipe and wastes electrical energy. At the same time, the inner tube must be cleared frequently. 3) Long periods of consistent operation will reduce the lifetime of the electric heating tube. In order to deal with these drawbacks, the power of the water dispenser is cut when not used and powered when needed. But in so doing, a user has to wait for a relatively long time to heat the water to a desired temperature. Obviously, this kind of water dispenser is not convenient.

To overcome the above-mentioned drawbacks, a kind of water dispenser has been developed to provide boiled water instantly. For example, Chinese Patent Number 99223771.8 discloses such a water dispenser. It includes a main body, a water tank in the upper part of the main body and a rapid heater in the lower part of the main body. The heater is composed of a UHT electric heating tube and several spiral baffle boards assembled into a heating tank whose water inlet is interlinked with the outlet of the water tank while its water outlet is connected with the hot water funnel through a guide pipe. Though this type of device can timely provide instant boiled water, it cannot be used with delicate multi-purpose household water dispensers due to its large size, complicated structure and additional insulation layer.

SUMMARY OF THE INVENTION

The technical problem this invention addresses is to provide a kind of rapid electric heating water dispenser which is small in size, compact in structure and easy to use as well as energy saving based on the current technology.

The technical scheme applied in this invention to solve the above problem is as follows: a rapid electric heating water dispenser includes a body, a base, an electric heating element located in the body, a hot water dispensing valve and a hot water outlet. On the lower part of the base, there is a reservoir connected with the hot water outlet successively through a hot water pipe, an electric heating element and a hot water drain valve. A feature of the present dispenser is that the electric heating element includes a water pipe and an electric heating tube which cling to or are in direct contact with each other through a casting body. There is a liquefaction inner tube between the outlet of the aforesaid water pipe and the hot water dispensing valve. The aforesaid electric heating tube has its capacity matched with the volume of the water pipe to heat the water passed by to at least 75° C.

The above-said electric heating element includes the upper electric heating element and the lower electric heating element with the upper water pipe and the lower water pipe. The upper electric heating tube and the lower electric heating tube are connected in parallel to each other and are connected to the power supply through the main switch installed in the body. Moreover, a high temperature switch installed in the body is connected in series to the branch circuit of the upper electric heating element.

The aforesaid upper water pipe's volume can be 10 ml, the aforesaid upper electric heating tube's capacity is 350 W–450 W, while the above-said lower water pipe's volume can be 30 ml, the above-said lower electric heating tube's capacity is 1350 W–1450 W.

There is a water head between the water inlet of the liquefaction inner tube (the outlet of the heating section) and the water circuit connected with it, and the water level of the liquefaction inner tube should be higher than that of the water circuit connected with it.

There can be installed a time switch on the front panel of the aforesaid body as well as a one-way valve in the pipe between the water inlet and the bailer. The upper and lower electric heating tubes are connected to the power supply through the time-delay opening contacts of the aforesaid time switch.

In so doing, automatic power and water cut-off can be achieved and consequently it is easier to operate.

On the wall of the body below the hot water outlet there can be installed a sensor switch whose contacts are connected in series to the heating wire of the upper and lower electric heating tubes.

On the aforesaid casting body there can be installed a thermal protection device and a thermostat and their contacts are connected in series to the heating wire between the heating tube and the power supply.

In the pipe between the bailer and the water inlet there can be installed a triple nozzle whose third nozzle is connected to the water outlet in the body through a drain pipe. In so doing, it is convenient to clear the water dispenser.

Compared with current technology, this invention enjoys the following advantages: since the water pipe and the electric heating tube which compose the electric heating element are integrated into a whole through the casting body, they are compact in structure, small in size and fit for current water dispensers. In the mean time, thanks to the appropriate capacity of the electric heating tube, drinking water will be heated rapidly when it flows through the pipe. Moreover, due to water head between the outlet of the heating section and the water circuit, water can not enter the liquefaction inner tube and flow out through the seal valve unless the water temperature rises to certain degree and the swelling capacity of the water is high enough to make up for this water head. Therefore, it is energy saving, quite easy to use as well as providing high-temperature drinking water. Moreover, it has completely solved the problem of reheating water in common water dispensers, and thus has avoided loss of nutrition content in water. In addition, the two-section heating application of upper heating element and lower heating element makes the heating system more sophisticated and therefore meets people's needs all the better. In conclusion, this invention is worth applying on the current water dispensers for its compact structure, large volume of water output and convenient operation.

DETAILED DESCRIPTION OF THE INVENTION

Figure 1:
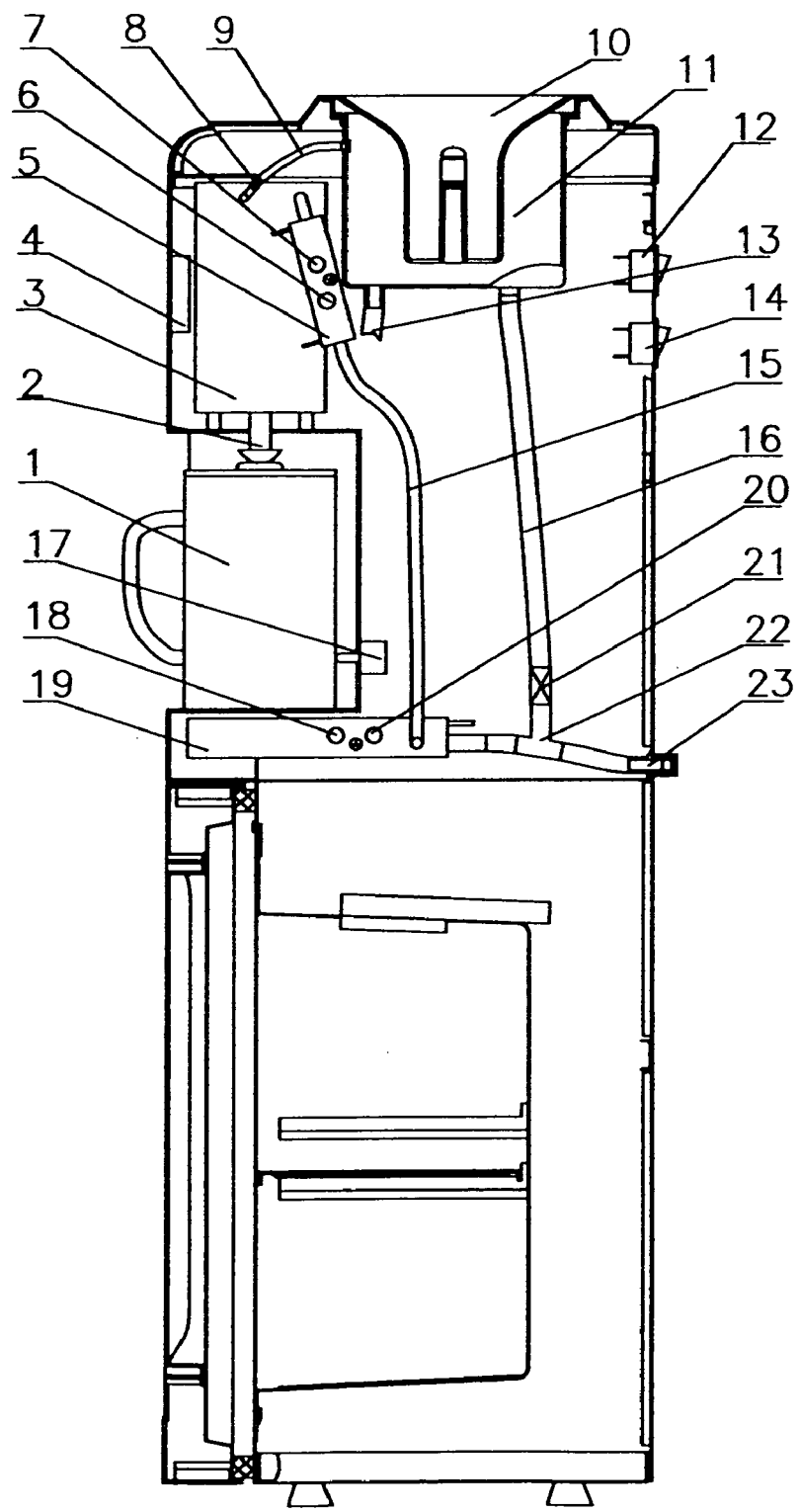
FIG. 1 is a structural representation of a preferred embodiment of the invention.
Figure 2:
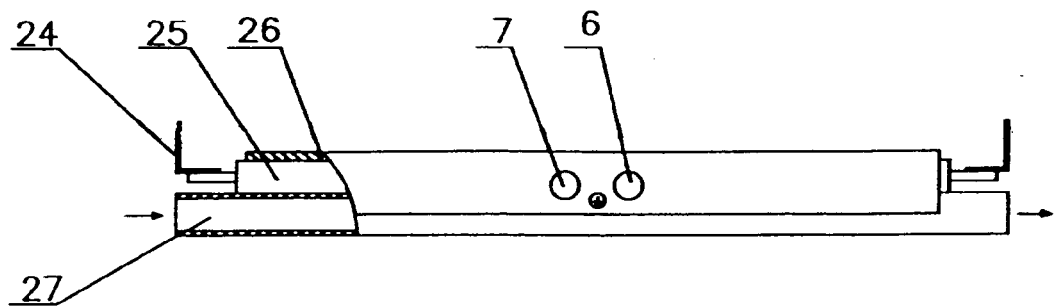
FIG. 2 is a structural representation of the upper electric heating element of a preferred embodiment of the invention.
Figure 3:
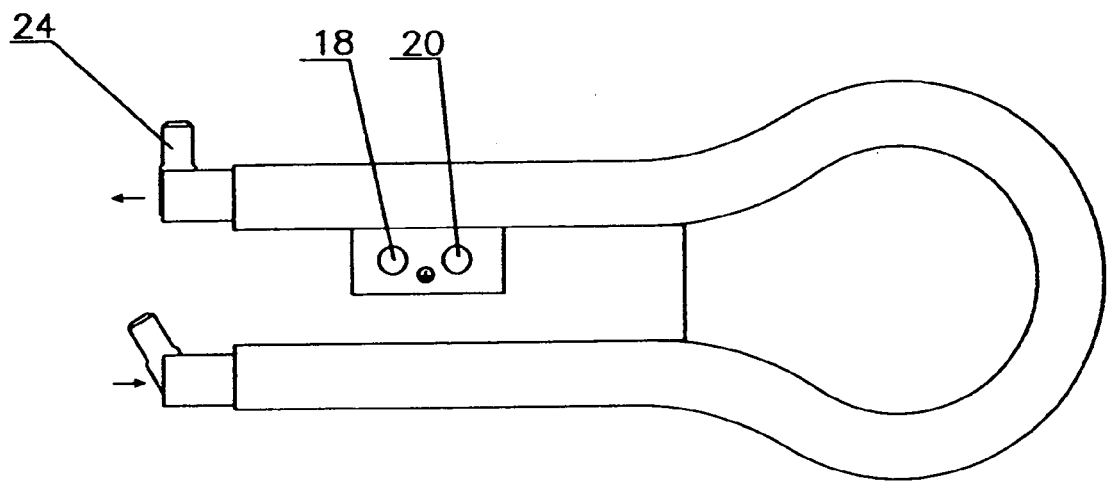
FIG. 3 is a structural representation of the lower electric heating element of a preferred embodiment of the invention.
Figure 4:
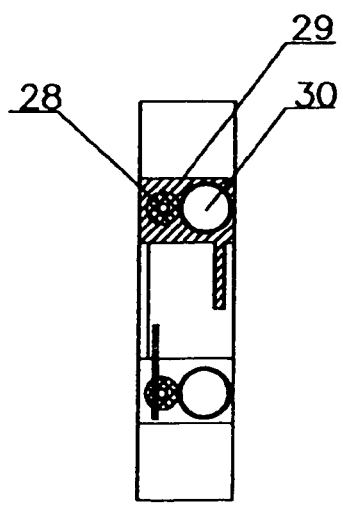
FIG. 4 is a sectional view of FIG. 3.

Shown in FIGS. 1–3, a water dispenser is composed of a body, a base 10, preferably a so-called "intelligent base," a heating system, a refrigeration system, a water dispensing device located in the body, and a reservoir 11 is on the lower part of the base. While the heating system and refrigeration system are located in the middle part of the body, there is a hollow in the front panel to place a cup holder and a cup 1. The lower part of the water dispenser can be made into a disinfection cabinet or a refrigerated cabinet as desired. The above-mentioned refrigeration system includes a cold water pipe 13, a cold inner tube, a cold water dispensing valve and a cold water outlet, while the heating system is composed of a hot water pipe 16 made of a silicone tube, an electric heating element, a liquefaction inner tube 3, a hot water dispensing valve 2 and a hot water outlet. The electric heating elements include a slug-shaped upper electric heating element 5, which includes a stainless-steel upper water pipe 27 and an upper electric heating tube 25, and an approximately U-shaped lower electric heating element 19. As shown in FIG. 2, the upper water pipe 27 and the upper electric heating tube 25 are in direct contact with and are integrated into one whole through an upper aluminum casting body 26 and electric connecting terminals 24 are installed on the two ends of the heating tube 25. Also, as shown in FIGS. 3 and 4, the lower electric heating element 19 includes a U-shaped stainless-steel lower water pipe 30 and a lower electric heating tube 28 which are in direct contact with one another and are integrated together through a lower aluminum casting body 29. Electric connecting terminals 24 are fixed on the two ends of a lower electric heating tube 28. The upper and lower electric heating tubes in the upper and lower heating elements are connected in parallel through their respective electric connecting terminals and then connected to a power supply through a main switch 12 located on the back of the body. Moreover, a high temperature switch 14 is installed on the back of the body which is connected in series to the branch circuit of the upper electric heating element 5. The upper and lower water pipes in the upper and lower electric heating elements are joined together through a silicon tube 15. The outlet of the upper water pipe 27 is linked with the liquefaction inner tube 3 which is located in the body above the cup 1. As a seal valve, the hot water dispensing valve 2 is located on the bottom of the liquefaction inner tube 3. The outlet of the dispensing valve 2 is known as the hot water outlet which is corresponds with the a through hole in the a cover of the cup 1. The liquefaction inner tube 3, the hot water dispensing valve 2 and the hot water outlet are designed for the sake of liquefaction of the high-temperature stream out of the heating section, easy control of hot water takeoff and sealing the inner water circuit to prevent pollution. In addition, between the liquefaction inner tube 3 and the reservoir 11, there is a return air pipe 9 on which the second one-way valve 8 is installed to prevent the backsiphon of the hot water during heating. In this way, the water in the reservoir 11 flows to the hot water outlet successively through the hot water pipe 16 the lower water pipe 30, the silicon tube 15, the upper water pipe 27, the liquefaction inner tube 3 and the hot water drain valve 2. In this implementing example, in order to rapidly heat the drinking water flowing by the lower water pipe to 75° C.–80° C., the volume of the lower water pipe 30 is preferably 30 ml and correspondingly the capacity of the lower electric heating tube 28 is chosen as 1400 W. However, it can be in the range of 1350 W to 1450 W, as needed to heat water for hot coffee.

Meanwhile, the volume of the upper water pipe 27 is approximately 10 ml and the capacity of the upper water pipe 27 is preferably 400 W. By the same token, the capacity of the upper electric heating tube can be in the range of 350 W to 450 W. In so doing, when the upper and lower electric heating elements are working at the same time, the water temperature in hot water outlet can be more than 85° C. for tea-making.

For automatic control of the water output and heating time, in this preferred embodiment, a time switch 4 is located on the front panel of the body, and a one-way valve 21 is installed in the hot water pipe 16 to prevent hot water from flowing back to the reservoir 11. Meanwhile time-delay opening contacts of the time switch 4 are also connected in series to the heating wire of the upper and lower electric heating tubes to exercise control on the heating time and water output. The closed status of the hot water dispensing valve 2 after taking out the cup 1 will prevent accidental burns caused by flowing-out of remaining hot water in the liquefaction inner tube. Moreover, in the front panel near the hollow, there is a sensor switch 17 to prevent damages caused by heating when the hot water drain valve 2 is pushed open by the cup 1. The contacts of the sensor switch 17 are also connected in series to the heating wires of the upper and lower electric heating tubes. In this way, the upper and lower electric heating tubes will not begin heating unless the cup 1 triggers the the sensor switch 17.

Furthermore, in order to prevent the upper and lower electric heating tubes from heating without water, on the upper and lower aluminum casting bodies there are respectively installed an upper thermal protection device 7 and a lower thermal protection device 18 whose contacts are respectively connected in series to heating wire between their own electric heating tube and the power supply. Meanwhile, on the upper and lower aluminum casting bodies, there are respectively installed an upper thermostat 6 and a lower thermostat 20 whose contacts are respectively connected in series to the heating wire between their own electric heating tube and the power supply to control the heating temperature of the heating tubes. Concerning the cleaning of the pipe, in the hot water pipe between the one-way valve 21 and the outlet of the lower water pipe 30, a triple nozzle 22 is installed with its third nozzle connecting to the water outlet 23 on the back of the body through the drain pipe. There is a cover on the water outlet 23. In so doing, it is quite convenient for periodic cleanings.

When in use, the cup 1 is placed on the cup holder with the cover of the cup 1 pushing open the water dispensing valve 2 and the cup body triggering the sensor switch 17 to close the contacts. The water barrel is placed on the base 10. The water flowing from the base into the reservoir 11 will divide into two channels. One of the two channels is as follows: water flows successively through the cold water pipe 13, the cold inner tube and cold water dispensing valve and out of the cold water outlet. The opening and closing of the cold water drain valve is controlled by a conventional cold water dispensing spigot. The other channel is as follows: water flows successively through the hot water pipe 16, the one-way valve 21, a T-fitting 22, the lower water pipe 30, the silicon tube 15, the upper water pipe 27, the liquefaction inner tube 3 and the dispensing valve 2, and flows into the cup 1 through the through-hole on the cup cover. The air in the lower and upper water pipes will be drained out through the silicon tube, the liquefaction inner tube 3 and the dispensing valve 2. When heating is needed, the main switch 12 is triggered, and the main power supply indicator will turn on. If hot water of 75° C.–80° C. is needed, the time switch 4 is turned clockwise. The heating indicator turns on and the lower electric heating element 28 is in operation. In this implementing example, the maximum timing is 3 minutes with an output of 1 liter of hot water. The drinking water is rapidly heated and swells when flowing through the lower water pipe 30. The hot water flows through the silicon tube 15, the upper water pipe 27 to the liquefaction inner tube 3 and into the cup through the dispensing valve 2. It only takes 10 to 20 seconds from setting the time to water take-off. When the time is up, the time delay opening contact of the time switch 4 prevents the lower electric heating element 28 from heating, and the heating indicator is switched off correspondingly.

If hot water of over 85° C. is needed, the user presses high temperature switch 14 while pressing the main switch, and then turns the time switch 4 clockwise. By the same token, the heating indicator and the high temperature indicator turns on. The upper electric heating element 25 and the lower electric heating element 28 are actuated simultaneously. The drinking water flows through the lower water pipe 30 and is rapidly heated by the lower electric heating element 28. When the hot water flows through the upper water pipe 27, again it is rapidly heated by the upper electric heating element 25. Thus the hot water being heated twice flows into the liquefaction inner tube 3. In the end it flows into the cup through the seal valve 2, and the through hole on the cup cover. If the time is up, it stops heating and supplying water. The indicator goes off at the same time.

Water cannot enter the liquefaction inner tube and flow out unless the water temperature rises to certain degree and the swelling capacity of the water is high enough to make up for the water head between the water outlet of the heating section and the former water circuit.

Under the condition that the water of the barrel is used up while one of the lower or upper heating pipes is still in work, the temperature of the corresponding aluminum casting body will rise rapidly. When it comes to a certain degree, the corresponding thermal protection device will work to cut off the power supply of respective electric heating tube and stop it from heating. In this way it implements the function of protection.

The invention claimed is:

1. A rapid electric heating water dispenser comprising: a body, a base, an electric heating element located in the body, a hot water dispensing valve and a hot water outlet; a reservoir on the lower part of the base connected with the hot water outlet successively through a hot water pipe, said electric heating element and said hot water drain valve; said electric heating element including a water pipe and an electric heating tube which are in direct contact with each other through a casting body; a liquefaction inner tube located between the outlet of the aforesaid water pipe and the hot water dispensing valve; the said electric heating tube having a capacity matched with the volume of the water pipe to heat the water passed by to at least 75° C.

2. The rapid electric heating water dispenser as described in claim 1, further including that said electric heating element is includes an upper electric heating element and a lower electric heating element with the upper water pipe and the lower water pipe connected together; the upper electric heating tube and the lower electric heating tube being connected in parallel and connected to the power supply through a main switch installed in the body; a high temperature switch installed in the body is connected in series to the branch circuit of the upper electric heating element.

3. The rapid electric heating water dispenser as described in claim 2, further including that the upper water pipe's volume is approximately 10 ml, the upper electric heating tube's capacity is approximately 350 W–450 W, while the lower water pipe's volume is approximately 30 ml, the lower electric heating tube's capacity is approximately 1350 W–1450 W.

4. The rapid electric heating water dispenser as described in claim 1, further including a water head between the water inlet of the liquefaction inner tube and the water circuit connected with the tube, the water level of the liquefaction inner tube being higher than that of the water circuit connected with the tube.

5. The rapid electric heating water dispenser as described in claim 2, further including a time switch installed on the front panel of the said body; a one-way valve is located in the pipe between the water inlet and the reservoir; the upper and lower electric heating tubes being connected to a power supply through time-delay opening contacts of said time switch.

6. The rapid electric heating water dispenser as described in claim 5, further including a sensor switch located on the wall of the body below the hot water outlet whose contacts are connected in series to the heating wire of the upper and lower electric heating tubes.

7. The rapid electric heating water dispenser as described in claim 6, further including that the aforesaid water dispensing valve is located at the bottom of the liquefaction inner tube and the said hot water outlet is located on the water dispensing valve.

8. The rapid electric heating water dispenser as described in claim 1, further including a thermal protection device installed on the said casting body and contacts of said thermal protection device are connected in series to a heating wire between the heating tube and a power supply.

9. The rapid electric heating water dispenser as described in claim 1, further including a thermostat installed on the said casting body and contacts of said thermostat are connected in series to a heating wire between the heating tube and a power supply.

10. The rapid electric heating water dispenser as described in claim 1, further including a T-fitting installed in the pipe between the reservoir and the water inlet whose third nozzle is connected to the water outlet in the body through a drain pipe.

11. The rapid electric heating water dispenser as described in claim 3, further including a time switch installed on the front panel of the said body and a one-way valve in the pipe between the water inlet and the reservoir; the upper and lower electric heating tubes being connected to the power supply through time-delay opening contacts of the said time switch.

12. The rapid electric heating water dispenser as described in claim 2, further including a thermal protection device installed on the said casting body contacts of said thermal protection device being connected in series to the heating wire between a heating tube and the power supply.

13. The rapid electric heating water dispenser as described in claim 3, further including a thermal protection device installed on the casting body contacts of said thermal protection device being connected in series to a heating wire between the heating tube and the power supply.

14. The rapid electric heating water dispenser as described in claim 2, further including a thermostat on the said casting body and contacts of said thermostat being connected in series to a heating wire between the heating tube and the power supply.

15. The rapid electric heating water dispenser as described in claim 3, further including a thermostat on the said casting body and contacts are connected in series to a heating wire between the heating tube and the power of said thermostat.

16. The rapid electric heating water dispenser as described in claim 2, further including that in the pipe between the reservoir and the water inlet there can be installed T-fitting installed in the pipe between the reservoir and the water inlet having a third nozzle connected to the water outlet in the body through a drain pipe.

17. The rapid electric heating water dispenser as described in claim 3, further including T-fitting installed in the pipe between the reservoir and the water inlet having a third nozzle connected to the water outlet in the body through a drain pipe.

18. A rapid electric heating water dispenser comprising: a body, a base, an electric heating element located in the body, a hot water dispensing valve and a hot water outlet; a reservoir on the lower part of the base connected with the hot water outlet successively through a hot water pipe, said electric heating element and said hot water drain valve; said electric heating element including a water pipe and an electric heating tube which are in direct contact with each other through a casting body; a liquefaction inner tube located between the outlet of the aforesaid water pipe and the hot water dispensing valve; the said electric heating tube having a capacity matched with the volume of the water pipe to heat the water passed by to at least 75° C.;

said electric heating element includes an upper electric heating element and a lower electric heating element with the upper water pipe and the lower water pipe connected together; the upper electric heating tube and the lower electric heating tube connected to the power supply through a main switch installed in the body; a high temperature switch installed in the body is connected to the branch circuit of the upper electric heating element; and a time switch installed on said body; the upper and lower electric heating tubes being connected to a power supply through time-delay opening contacts of said time switch.

19. A rapid electric heating water dispenser comprising a body, a base, an electric heating element located in the body, a hot water dispensing valve and a hot water outlet; a reservoir on the lower part of the base connected with the hot water outlet successively through a hot water pipe, said electric heating element and said hot water drain valve; said electric heating element including a water pipe and an electric heating tube which are in direct contact with each other through a casting body; a liquefaction inner tube located between the outlet of the aforesaid water pipe and the hot water dispensing valve; the said electric heating tube having a capacity matched with the volume of the water pipe to heat the water passed by to at least 75° C.; and said body defining a cupholder constructed and arranged in relation to said dispensing value and having a sensor switch such that the placement of a cup in said cupholder triggers said dispensing value and said sensor switch to energize said electric heating element.

* * * * *